Nov. 23, 1965 C. H. VINCENT 3,219,939

APPARATUS FOR THE DETECTION OF EXCURSIONS IN A REACTOR

Filed July 25, 1961 12 Sheets-Sheet 1

APPARATUS FOR THE DETECTION OF EXCURSIONS IN A REACTOR

Filed July 25, 1961

United States Patent Office 3,219,939
Patented Nov. 23, 1965

3,219,939

APPARATUS FOR THE DETECTION OF EXCURSIONS IN A REACTOR

Charles Holmes Vincent, Basingstoke, England, assignor to United Kingdom Atomic Energy Authority, London, England Filed July 25, 1961, Ser. No. 126,573
Claims priority, application Great Britain, July 29, 1960, 26,606/60
5 Claims. (Cl. 328—140)

This invention relates to the detection of a sudden increase or decrease in the mean rate of occurrence of consecutive events at random and to apparatus for achieving such detection.

The invention will be discussed with reference to the following drawings in which.

Figure 9:
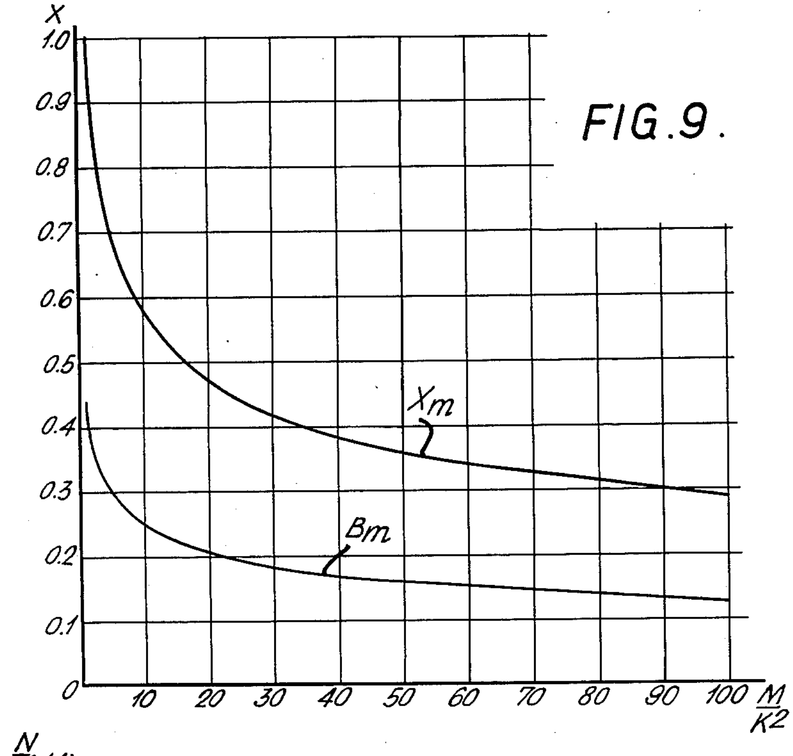
FIGURE 9 is a graphical representation of the minimum value of X for the diode pump ratemeter circuit with exact bias plotted as a function of M/K2, and of the value of B (the ratio of the time constant to the period at which it occurs).
Figure 17:
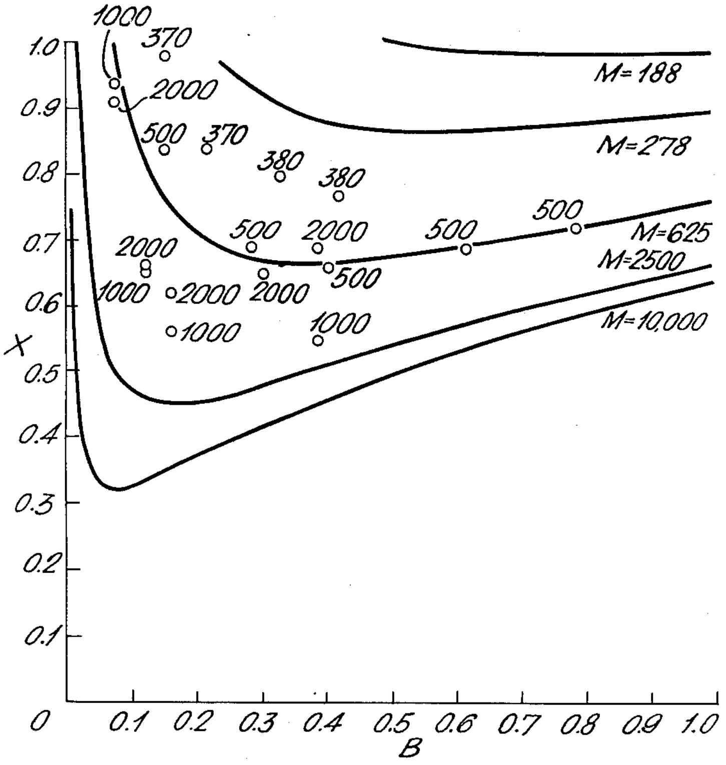

FIGURE 17 compares experimentally obtained figures (indicated by numbered circles) with theoretical curves of the function shown for linear bias in FIGURE 9 above.

Figure 19:
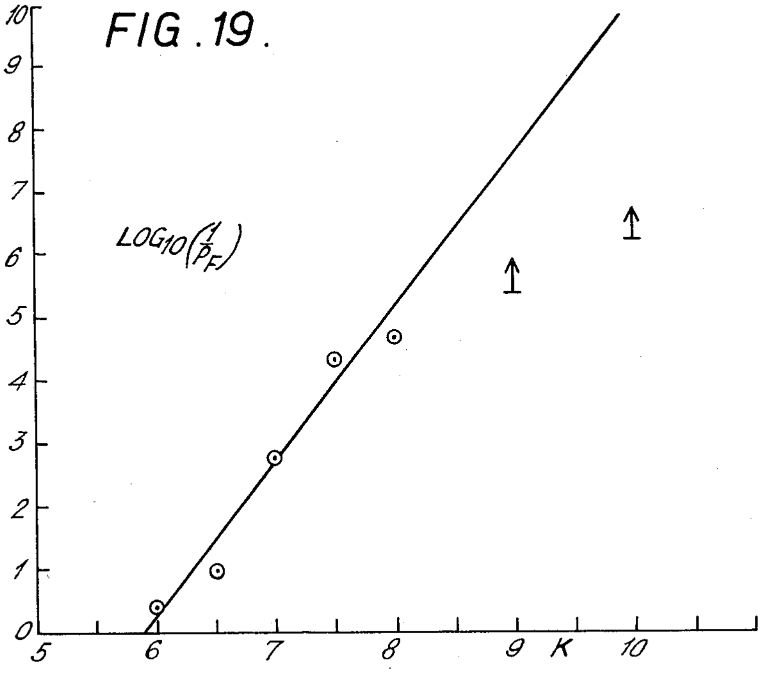
Figures 16, 18:
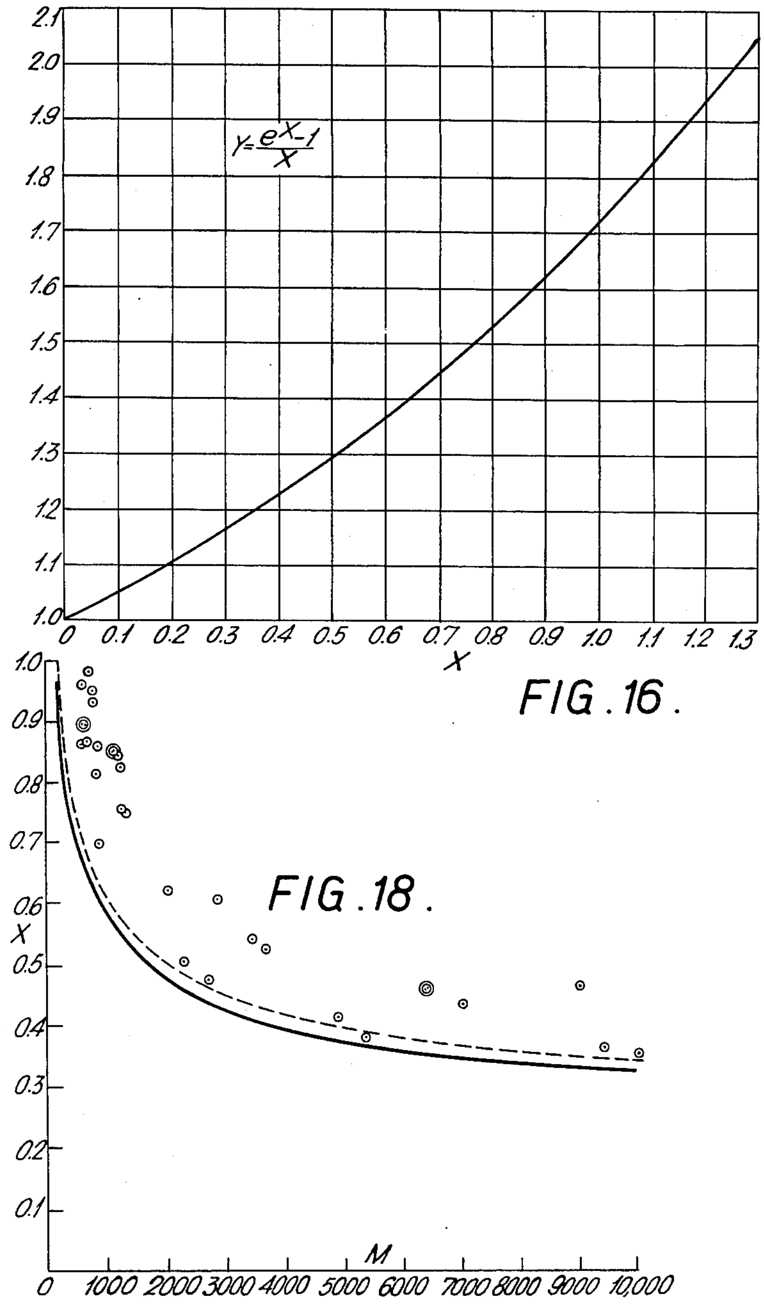
FIGURE 16 is a graph of the relationship of X and $$\frac{e^x-1}{X}$$

FIGURE 18 compares figures obtained experimentally (indicated by numbered circles) with theoretical curves of the relationship of X and M, the solid line being for closely spaced time-constants, and the dotted line being for spacings of $\sqrt{10}$, and FIGURE 19 is a graph of the relationship between the logarithm of the reciprocal of the false alarm rate (in seconds) and the value of K.

Figures 5, 20:
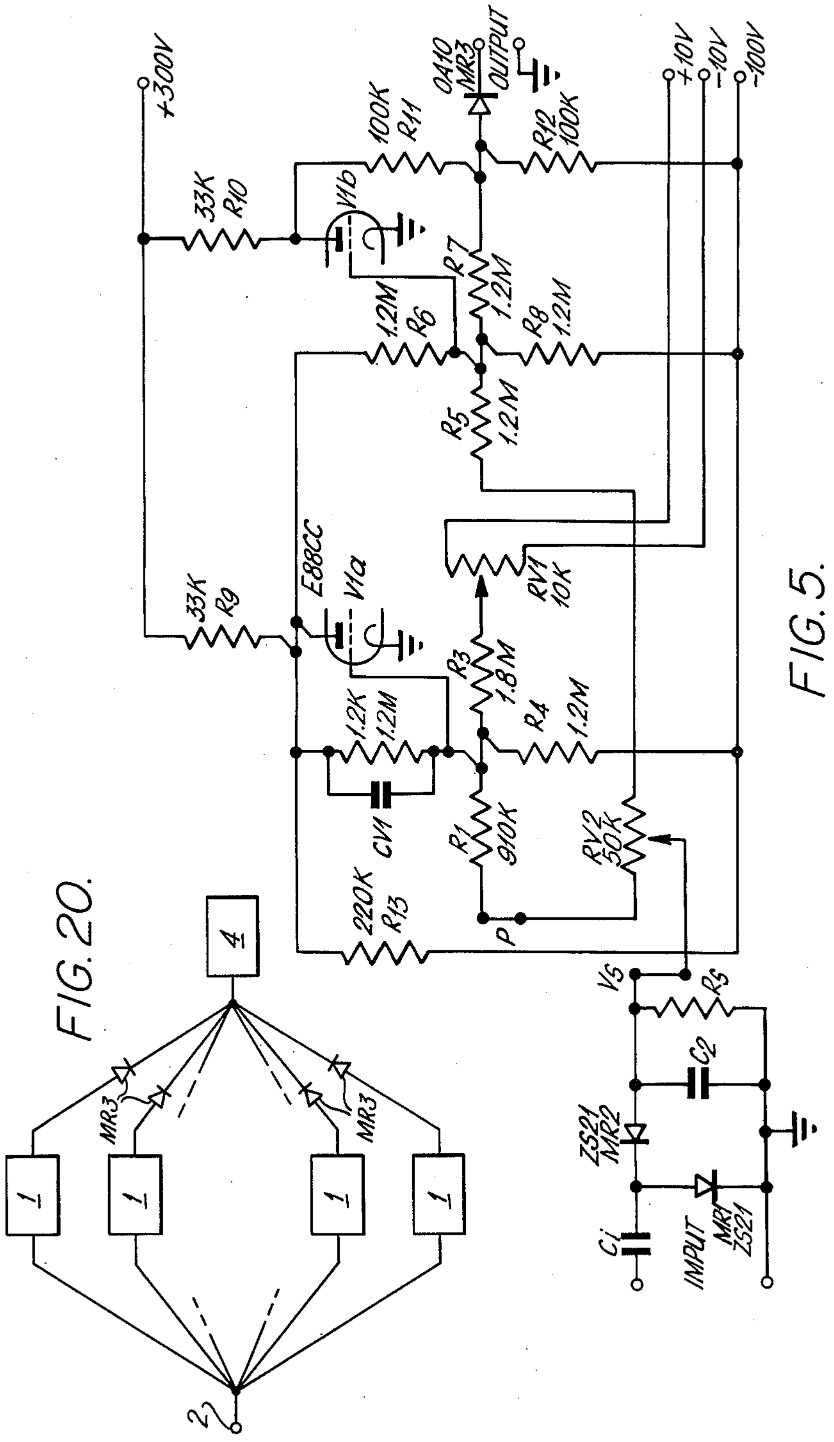
FIGURE 5 shows a biasing circuit coupled to the diode pump ratemeter circuit.

FIG. 20 is a block schematic diagram of an embodiment of the invention.

Figure 1:
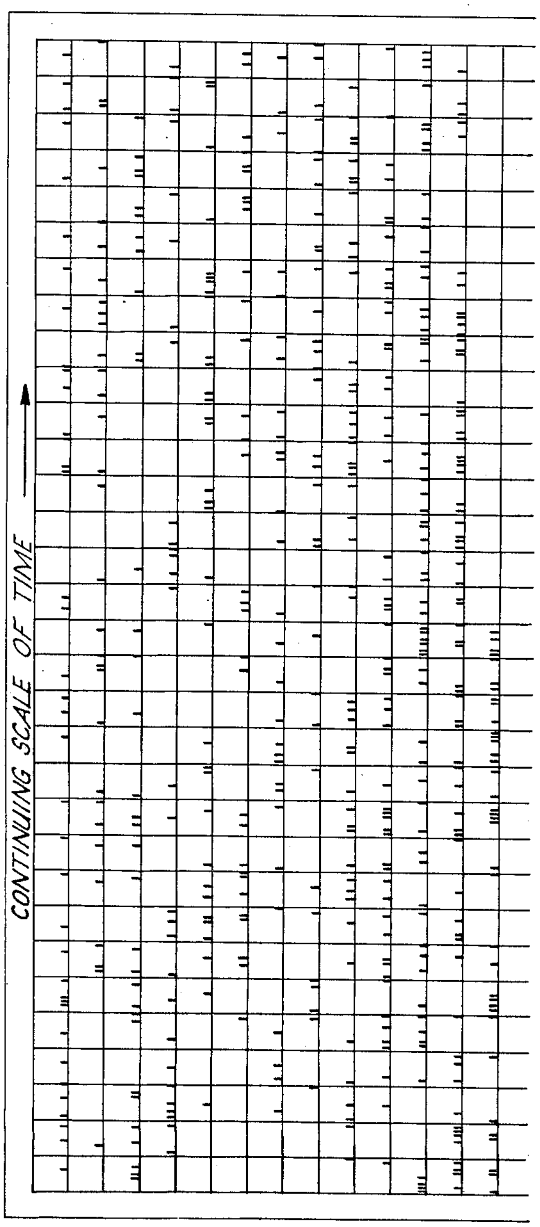
FIGURE 1 is a representation of events occurring at random, time moving along each line in turn.

The word "sudden" is intended in this specification to refer to an excursion which occurs at a rate comparable with a purely random fluctuation in the mean rate. An excursion which is sudden in this sense might occupy some hours or days, or even years if the number of consecutive events was small. FIGURE 1 is an attempt to illustrate this point. In the drawing the horizontal lines in sequence represent consecutive time and the marks represent a series of events occurring at random. The total time may be a fraction of a second or it may be a large number of years. The invention enables the provision of answers to the questions: "Is there an excursion in this record and if so where does it start?" while still giving a negligible probability of a false alarm. The rapid detection of such an increase or decrease is difficult because it is necessary to distinguish the increase from a random grouping of events occurring by chance at a constant mean rate.

The events giving rise to such random groupings may have any physical form. They may, for example, be the arrival of individual neutrons at a neutron detector in a nuclear reactor, and it is this case which is of great practical importance. They may be electrical pulses produced by a random pulse generator, and it is this case which is used hereinafter to test the invention.

A known method of detecting such an increase in nuclear reactors is the use of a reactor period meter. This instrument indicates the period (the time for a change of mean pulse rate by a factor of $e=2.71828$) when the mean pulse rate is increasing or decreasing steadily in an exponential manner.

It is arranged to give warning when the period falls below a certain chosen value. A reactor period meter is a useful device for the control of normal changes in the power level of a nuclear reactor, but for giving warning of a sudden increase in the power level which might occur in an emergency, all presently known devices have the following defects:

(a) The time required to provide a warning output is longer than desirable in relation to the period of the excursion.

(b) At the lower mean input pulse rates which are obtained at lower power levels of reactor operation, they give false warnings arising purely from random fluctuations when the mean rate is, in fact, quite steady.

Both these defects are undesirable.

It is not necessary for the variation which it to be detected to be a sudden increase of the kind which would be associated with a reactor runaway. A dangerous situation may arise in other cases with a very slow rise in the rate being observed. For example a burst in a fuel element in a nuclear reactor may release radioactivity only very slowly, the period of the rise in radioactivity released being sometimes of the order of hours. It is obviously important to detect a burst fuel element as soon as possible but up to now it has been difficult to distinguish a significant slow rise in radioactivity from purely random fluctuations in background radiation in good time.

From the safety point of view, it is necessary that the increasing rate of pulse arrival which indicates a burst fuel element, supercritical condition in a reactor or critical assembly, should be recognized as quickly as possible. On the other hand, it will cause great inconvenience if the recognition equipment responds to an effect which is purely a random fluctuation and does not really indicate a significant increase in the mean pulse rate. It takes time to check the equipment and start up again after an unnecessary shut-down. Taken separately, the requirements of attaining a high speed of response or of recognising only increases or decreases of genuine significance are not difficult to meet. However, the combination of great speed of response with freedom from spurious alarms has not been achieved in known systems and it is an object of the invention to provide such a combination. Provided that the number of events per period is not too low, it has been found that the time of detection of an excursion from the mean can be less than one period. Even with a low number of events, the performance obtainable through the invention is near the theoretical optimum, although a number of periods may be required to detect the excursion.

The invention will be best understood after a discussion of the problem to be solved in providing the invention. The discussion will concern itself with input electrical pulses but is obviously of general application.

Consider an excursion in which there is a constant mean rate of pulse arrival $\rho(o)$ until a time given by $t=o$. Each pulse provides the same increment which then decreases with time in accordance with a weighting function $w'(t')$ where $w'(t')$ is the ratio of the individual increment after a time $t'$ to its initial value. It will be convenient to write $\rho$ for $\rho(o)$. For $t>o$ let $$\rho(t)=\rho[1+f(t)]$$

If detection of the excursion occurs at a time $t=D$, the increase in the output reading at that time is given by $$\int_0^D \rho w'(t')f(t)\,dt$$

Now the significance of this increase is determined by its ratio to the standard deviation of the reading at the steady rate. This standard deviation is given by $$\sqrt{\int_0^\infty \rho[w'(t')]^2dt'}$$

The value of D is determined by the requirement that the significance ratio $$r=\frac{\int_0^D \rho w'(t')f(t)\,dt}{\sqrt{\int_0^\infty \rho[w'(t')]^2dt'}} \qquad (1)$$

should reach a specified minimum value K. Let us investigate the maximum value of this ratio, for any given value of D as the weighting function is varied.

For any given value of D, we may write $$\int_0^D \rho w'(t')f(t)\,dt=\int_0^D \rho w'(D-t)f(t)\,dt$$

$$=\int_0^D \rho w(t)f(t)\,dt \text{ say}$$

It is obvious that $w(t)$ should be 0 for $t<0$ (that is $t'>D$) since any weighting given to pulses occurring before the excursion starts would only increase the standard deviation without affecting the registered increase and would therefore decrease the significance factor of the latter. We may therefore write for the standard deviation.

$$\sqrt{\int_0^\infty \rho[w'(t')]^2dt'}=\sqrt{\int_0^D \rho w'(t')^2dt'}=\sqrt{\int_0^D \rho[w(t)]^2dt}$$

We then require to find the form of $w(t)$ which will give the maximum value of $r$ for any given $\rho$, D and $f(t)$, where $$\frac{r^2}{\rho}=\frac{\left[\int_0^D w(t)f(t)\,dt\right]^2}{\int_0^D [w(t)]^2dt} \qquad (2)$$

Any function $w(t)$ from $t=0$ to $t=D$ can be put in the form $$w(t)=Af(t)+\delta(t)$$

where A is constant and $\delta(t)$ is such that $$\int_0^D f(t)\delta(t)\,dt=0$$

by taking $$A=\frac{\int_0^D f(t)w(t)\,dt}{\int_0^D [f(t)]^2dt}$$

Substituting for $w(t)$ in the expression for $r^2/\rho$ in Equation 2, we obtain $$\frac{r^2}{\rho}=\frac{\left[\int_0^D f(t)[Af(t)+\delta(t)]dt\right]^2}{\int_0^D [Af(t)+\delta(t)]^2dt}=$$

$$A^2\frac{\left[\int_0^D \{f(\mathrm{t})\}^2dt\right]^2}{A^2\int_0^D \{f(t)\}^2dt+\int_0^D \{\delta(t)\}^2dt} \qquad (3)$$

Since $\{\delta(t)\}^2$ is always positive, it follows that its integral must be a minimum and that the above expression must be a maximum when $\delta(t)\equiv 0$. That is, the required weighting function is one which is proportional to $f(t)$ at any time from $t=0$ to $t=D$.

We then have, for this optimum weighting function $$\frac{r^2}{\rho}=\int_0^D \{f(t)\}^2dt \qquad (4)$$

At the minimum time D for a significant increase, this becomes $$\frac{K^2}{\rho}=\int_0^D \{f(t)\}^2dt \qquad (5)$$

This shows that for any given value of $\rho$ and for any given excursion, as specified by the function $f(t)$, the maximum ratio and obtainable by varying the weighting function $w'(t')$ for a given value of D is an increasing function of D.

The above equation can serve as a very useful basis of comparison, as an absolute optimum with which the performance of any actual equipment may be compared. Moreover, since Equation 3 contains only a second order term in $\delta(t)$, the fitting of the weighting function to $f(t)$ does not need to be very exact in order to obtain a close approach to the optimum performance. For example, if we take $3t/2$ as a quite crude approximation to $f(t)=e^t-1$ from $t=0$ to $t=1$ (see FIGURE 2) the reduction in the ratio for $r^2/\rho$ from the optimum is only about 1%. Since $f(t)$ is normally a rising function of $t$, in the cases of interest, it is to be expected that a falling function $w'(t')$ of $t'$ will be best, in general. (It will be remembered that $w'(t')=w'(D-t)$ as given above.) The duration of the weighting function waveform $w'(t')$ may be matched to the requirement for optimum performance on each excursion that comes by using a multiplicity of circuits with different weighting function durations and taking the response of the fastest of these. The exact form of the weighting function $w'(t')$ for optimum performance can only be specified when the exact form of the excursion to be detected is known as well, that is, when $f(t)$ is given.

Fortunately, as we have seen above, the exact matching of the two waveforms is not a critical requirement. The precise form of $w'(t')$ will normally be determined by the choice of a simple and convenient arrangement to produce it, rather than by an attempt to match precisely the expected form of the excursions. We shall consider exact exponentially rising excursions in all the examples, in order to give $f(t)$ a specific form and enable the expected performance to be calculated. However the circuits proposed will respond similarly for any other form of rising rate in the excursion.

In the case of an exponential excursion, we have, for $t>0$.

$$\rho(t)=\rho e^{\frac{t}{P}}$$

where P is the "period" of the excursion, and $$f(t)=\left(e^{\frac{t}{P}}-1\right)$$

Figure 6:
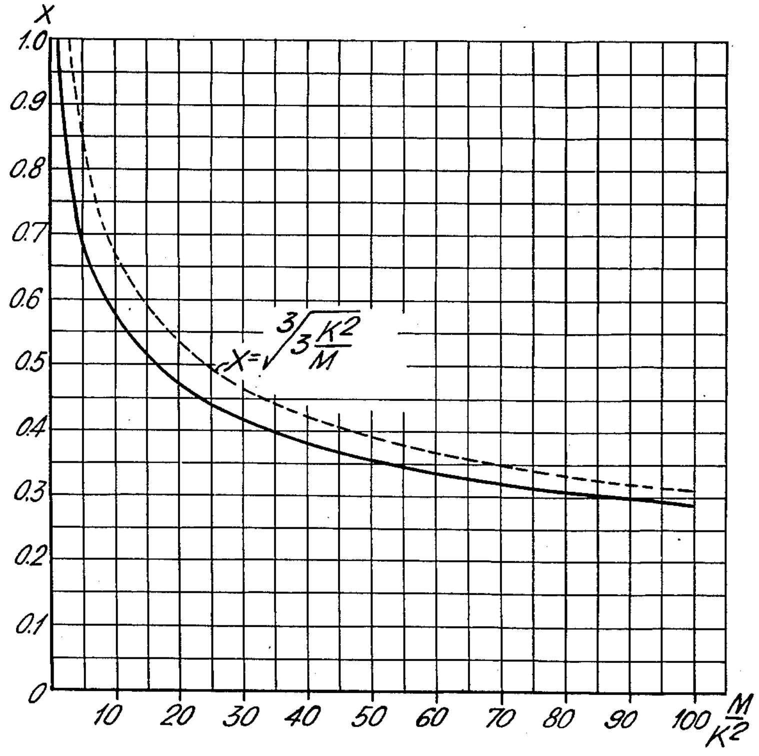
FIGURE 6 is a graph showing the absolute minimum value of X (the ratio of the detection time to the excursion period) for an exponential excursion as a function of M/K2, the ratio of the mean number of pulses in one period at the initial steady state to the square of the minimum significance ratio.

We therefore have $$\frac{K^2}{\rho}=\int_0^D\left(e^{\frac{t}{P}}-1\right)^2dt=\frac{P}{2}\left[\left(e^{\frac{D}{P}}-2\right)^2-1\right]+D$$

$$\frac{K^2}{\rho P}=\frac{1}{2}\left(e^{\frac{D}{P}}-2\right)^2-\frac{1}{2}+\frac{D}{P}$$

or $$\frac{K^2}{M}=\frac{1}{2}(e^X-2)^2-\frac{1}{2}+X \qquad (6)$$

where $M=\rho$ P is the mean number of pulses which would occur in one excursion period at the initial steady rate, and $X=D/P$. The absolute value of the time-scale is of no theoretical importance in this problem and the last form of the equation has the advantage of being independent of it. In FIGURE 6 X is plotted against $M/K^2$, which is a more convenient form in practice. It will be seen that a large increase in $M/K^2$ is needed to produce a small decrease in X.

The best fit weighting curve for $X<<1$ (for $M>>K^2$) is a straight line through the origin, being the beginning of an exponential rise. In this case, we have either from Equation 6 or directly the approximate answer $$\frac{K^2}{M}=\frac{X^3}{3}$$

$$\therefore x=1.4422\left(\frac{K^2}{M}\right)^{1/3} \qquad (7)$$

This curve is shown (dotted) for comparison in FIGURE 6 and can be seen to fit the optimum curve quite well down to fairly low values of $M/K^2$.

The best fit weighting function for $X>>1(M<<K^2)$ is an exponentially rising one $$e^{\frac{t}{T}}$$

where $T=P$, in this case. We then have, approximately, $$\frac{K^2}{\rho}=\int_0^D\left(e^{\frac{t}{P}}\right)^2dt=\frac{P}{2}e^{\frac{2D}{P}}$$

$$\therefore x=-\frac{1}{2}\log_e\left(\frac{1}{2}\frac{M}{K^2}\right) \qquad (8)$$

The invention therefore in its broadest aspect provides a method of detecting a sudden increase or decrease in the mean rate of occurrence of consecutive events occurring at random, which method comprises feeding a signal for each event into a storage means adapted to add substantially equal increments, one for each signal, the storage means having a weighting function which falls substantially to zero after a limited time, and observing the variation of the sum of the increments from the mean in terms of standard deviation of the said mean. The invention also consists in apparatus for carrying out the above method.

Figure 3:
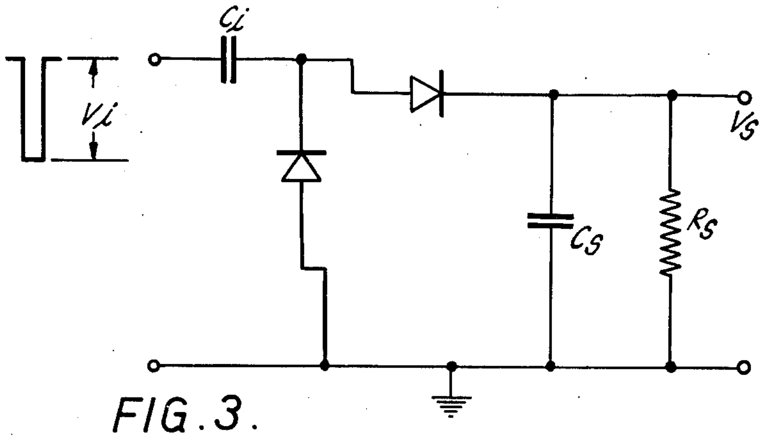
FIGURE 3 is a diagram of a diode pump ratemeter circuit.

A sensing means may be used to indicate the variation at any instant of the sum of the increments from the mean, which mean itself may be fixed or moving. When the events are electrical pulses the apparatus will include a pulse-shaping device. The function of the pulse-shaping device is to receive the input pulses, which may be of various amplitudes and shapes, and to generate from each one a pulse of specified duration and amplitude. This device may be arranged to reject or ignore all input pulses below a certain amplitude level, if this is desired, to avoid interference by spurious electrical fluctuations not arising from the desired type of event. A flip-flop or monostable multivibrator with a small dead time is an example of a suitable known device for performing the pulse-shaping function. The shaped pulses are then fed to the storage means. A suitable storage means comprises a condenser with a resistor connected across it. A diode pump circuit, of which a diagram is appended hereto, at FIGURE 3 is a suitable known means of passing a substantially constant increment of charge into such a storage condenser when it is used with a flip-flop or other suitable pulse-shaping circuit, under suitable conditions.

The storage means will normally have a falling weighting function $w'(t')$ in accordance with the principles described above. The weighting function of the storage condenser and resistor described by way of example is of the form $$w'(t')=e^{\frac{-t'}{RC}}$$

where RC is the time-constant which is the product of the capacity and of the leakage resistance. Such a weighting function is quite suitable. A multiplicity of storage devices with different weighting function durations may be used in order to suit different possible excursions which may occur, in accordance with the principles described above.

As has been made clear above, the absolute time scale for the occurrence of the excursion is not of importance insofar as the use of the invention is concerned. It is not necessary therefore for the storage means to receive signals at the rate at which the events occur. It is necessary only that the time relationships of the events should not be altered. A sequence of signals could thus be fed into the storage means at a rate quicker or slower than the rate at which the excursion occurred in reality. So long as the weighting function of the storage means was appropriate to the rate of the excursion as presented to the storage means, the operation of the invention would be unaffected. In practice therefore, in order to avoid difficulties due to excessively large condensers or very high resistances, it would be expedient to record, for example on magnetic tape, pulses widely separated in time and then to run the tape through at high speed to determine whether a sudden excursion is under way. Other means may of course be used to achieve a similar result. The run-through should naturally be repeated at a frequency appropriate to the likely period of the excursion.

The function of the sensing means is to indicate when the charge, voltage or other quantity in each storage means, has increased above its mean value by more than a selected amount which is chosen to be of negligible probability in a purely chance fluctuation. This probability is a known function of the amount of departure from the mean for any specified weighting function. The sensing means may be arranged to operate on the minimum departure from the mean value which does not permit an objectionable rate of false alarms, in accordance with the aforesaid known probability. The amount of departure so chosen will normally vary with the input pulse rate and the sensing device must be so arranged as to provide this variation.

By way of example for use with a diode pump circuit, a suitable sensing device may comprise a further diode pump circuit, storage condenser and resistor, receiving input pulses simultaneous with those entering the storage device, but provided with a much larger storage condenser or with a following integrating circuit so that it holds a charge and voltage appropriate to the mean input pulse rate over a relatively long preceding interval at any instant, together with further circuits arranged so that the voltage output is balanced against the output of the first-described storage circuit to give a voltage which is an indication of the departure of the latter from its mean value. A suitable circuit is given in FIGURE 4. The balancing may be performed by having the two diode pump circuits of opposite polarity and fed with simultaneous pulses of opposite sign. Alternatively the sensing means may comprise an amplifier adapted to invert the output of the diode pump circuit or the like, means for integrating the said output with a long time constant relative to that of the diode pump circuit of the like, and means for mixing the said inverted and uninverted outputs of the diode pump circuit and a fixed bias.

An example of such a circuit is shown in the accompanying FIGURE 5.

Figure 2:
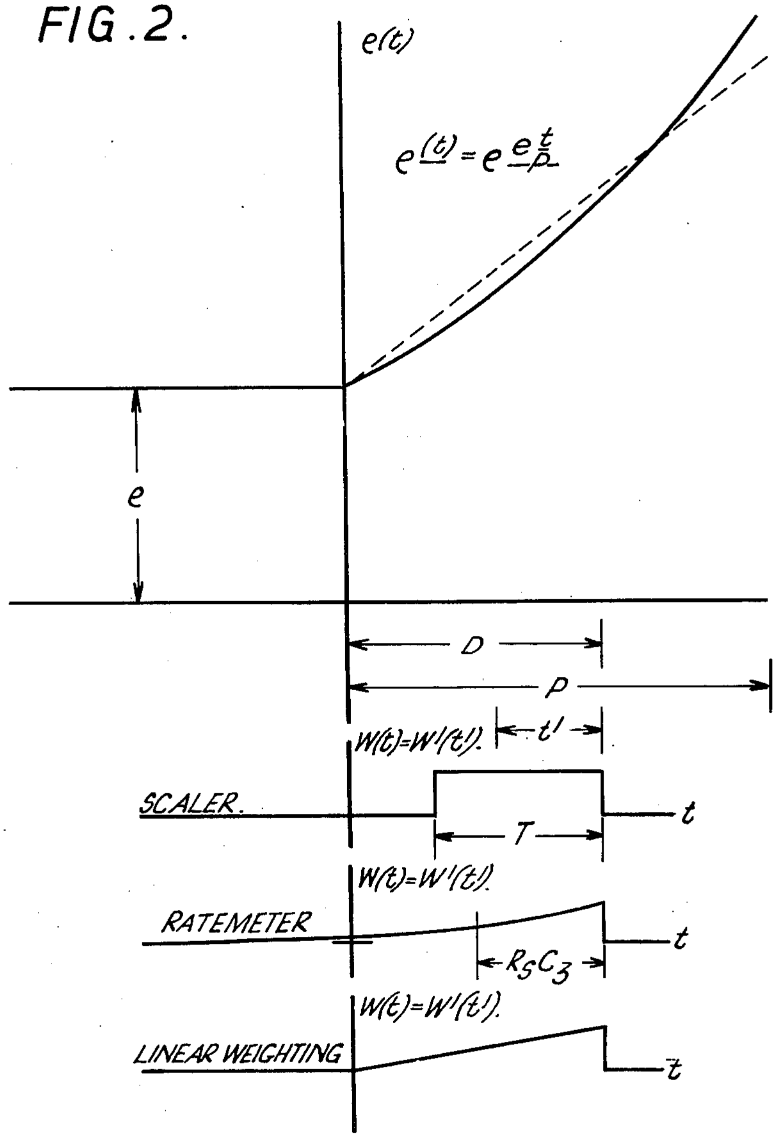
FIGURE 2 is a graphical representation of an exponential excursion together with some weighting functions corresponding to some types of known detection equipment.

In FIGURE 5 an amplifier V1*a* inverts the output V*s* of the diode pump circuit, shown in FIGURE 2, with a gain of 1.2. The inverted output is integrated and mixed with the original diode pump output and a fixed bias applied at RV1. The inverted output is integrated by capacitor CV1 together with $R_2$ to have a time constant long in relation to that of the diode pump circuit. The negative output preponderates in the mixing and the overall bias corresponds to the voltage increment for $(0.2\rho T+62.5)$ pulses into the diode pump circuit as hereinafter explained.

The direction of the bias applied and of the voltage change to operate the discriminator may be reversed if desired to indicate a decrease instead of an increase.

We can now consider the ordinary diode pump (linear rate-meter) circuit, as shown in FIGURE 3, and see how its performance compares with the optimum. Let $C_s$ be the storage capacity of the diode pump circuit, $C_i$ the charging capacity and R the leakage resistance. Let the input pulse amplitude be $V_i$. The discharge time-constant of the storage condenser is then $$T=R_sC_s$$

The mean voltage on the storage capacity with a given input pulse rate neglecting any reduction in the charge per pulse as this voltage rises, is $$V_s=RV_iC_i\rho \qquad (9)$$

We can regard this as the storage of N input charges where $$N=\frac{C_sV_s}{C_iV_i}$$
$$=\rho T \qquad (10)$$

The fluctuation of voltage or charge superimposed on these values is a root mean square fluctuation of $$\sqrt{\frac{N}{2}}$$

charges or $$\sqrt{\frac{N}{2}}\frac{V_iC_i}{C_s}\text{ volts}$$

In the case of the excursion, we may consider the fluctuations discussed above as superimposed on a smoothly varying current $V_iC_i\rho(t)$ into the storage condenser. The response of the circuit can be obtained by ordinary circuit theory, which gives $$\frac{V_s(t)}{V_s(0)}=\frac{T}{P+T}e^{-\frac{t}{T}}+\frac{P}{P+T}e^{\frac{t}{P}} \qquad (11)$$

For a specified value of K, this will represent a significant increase on the mean value before the excursion at a minimum delay D if $$\frac{T}{P+T}e^{-\frac{D}{T}}+\frac{P}{P+T}e^{\frac{D}{T}}=1+\frac{K\sqrt{\rho T/2}}{\rho T} \qquad (12)$$

The function of D on the left-hand side of this equation is monotonic and increasing, having the value of 1 at $D=0$, and $\infty$ at $D=\infty$. There is therefore always a solution for D and this solution is unique.

If we put $X=D/P$ and $B=T/P$, we obtain $$\frac{B}{B+1}e^{-\frac{X}{B}}+\frac{1}{B+1}e^{X}=1+\frac{1}{\sqrt{2}\sqrt{B}}\sqrt{\frac{K^2}{M}} \qquad (13)$$

Figure 7:
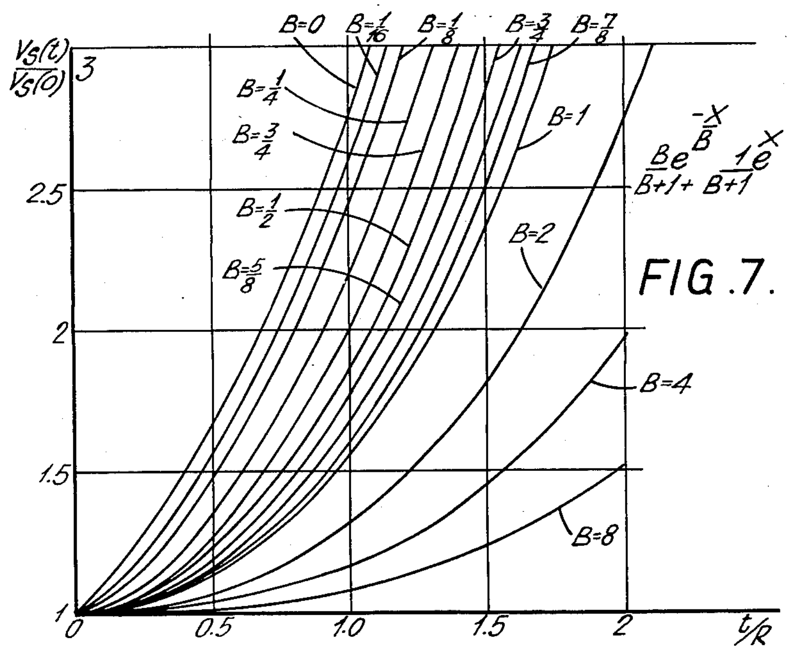
FIGURE 7 is a graphical representation of the response of the diode pump ratemeter circuit to an exponentially rising input.
Figure 8:
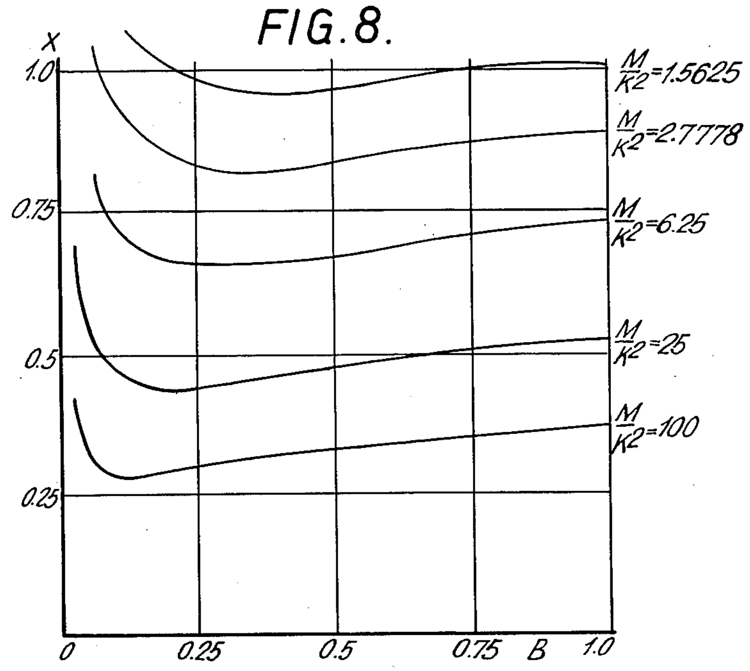
FIGURE 8 is a graphical representation of the optimum time-constant for the diode pump ratemeter circuit with exact bias.

We require to find the value of B which gives the minimum value of X for each value of $M/K^2$ and to plot this minimum value of X against $M/K^2$. An approximate graphical derivation of this function is shown in FIGURES 7 and 8. In FIGURE 7, the different curves give the left-hand side of the Equation 13 as a function of X for various values of B, as labelled. The curves of FIGURE 8 are obtained from the interceptions, for a fixed value of $M/K^2$ in each case, of these curves with the abscissae representing the corresponding values of the right-hand side of the equation. The minimum value of X for each value of $M/K^2$ is clearly shown and it will be seen that the value of B is not very critical at the minima, which are broad. FIGURE 9 shows the minimum value of X plotted against $M/K^2$. The values for this curve were computed numerically. The value of B at the minimum is also shown and this will be seen to be slightly less than $X/2$. The optimum curve, from our previous case, could not be shown for comparison as the two curves are so close as to render this impractical. The rate-meter curve lies only at most one percent higher than the absolute minimum curve, over the range shown and co-incides with it at low values of M. Since the value of the time-constant is not very critical at the optimum (see FIGURE 8), it is possible to meet the time-constant requirement by having a sequence of pump circuts, fed with the same input pulses and having their time-constants spaced by a suitably small ratio, e.g., $\sqrt{10}$.

Two parameters, say P and M, are needed to describe any given excursion fully, as regards the input signal received by the equipment. Since two parameters are required to describe the input signal, the arrangement of detection circuits must possess two corresponding variables, if it is to respond suitably to all possible inputs (over a range determined by the requirements of the particular task). One of these variables is provided by the choice of the time-constant T, from the range of values provided by the sequence of circuits, to obtain the optimum T for the given P and M. The other variable must be provided by the ability of each circuit to operate satisfactorily over a range of input pulse rates or storage condenser voltages. We may express this by saying that each circuit must be able to operate over a range of values of $\rho$T (that is, of N). It should be noted that the optimum value of T is an explicit, mathematically determinable function of P and M, once a value has been specified for K, since the optimum value of B is found from Equation 13 as a function of $M/K^2$ and $T=BP$.

At the optimum condition, we have that $$B=F_{\left(\frac{M}{K^2}\right)}$$

where F is the function given in FIGURE 9. It follows that $$N=MB$$
$$=MF_{\left(\frac{M}{K^2}\right)}$$

$$= K^2 \frac{M}{K^2} F\left(\frac{M}{K^2}\right)$$

$$= K^2 F'\left(\frac{M}{K^2}\right) \text{ say}$$

$$\therefore \frac{N}{K^2} = F'\left(\frac{M}{K^2}\right)$$

Figure 10:
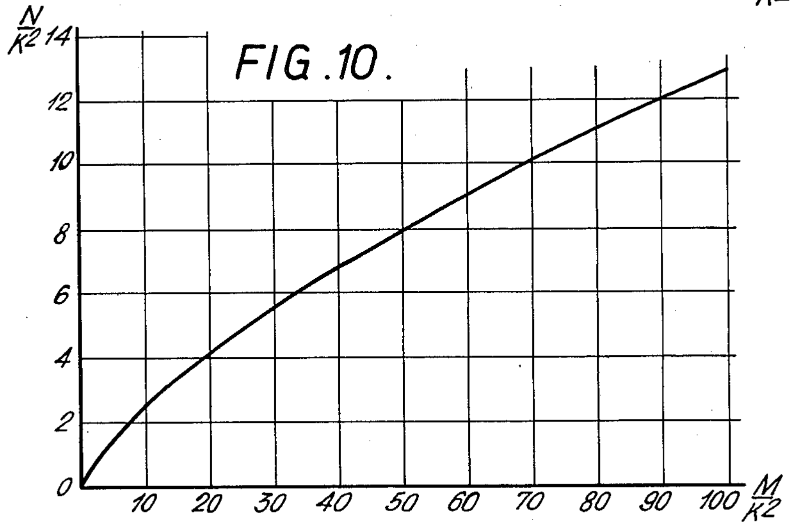
FIGURE 10 is a graphical representation of the relationship between N/K2 (the ratio of the number of pulses in one time constant to the square of the minimum significance ratio) and M/K2 in the exact bias ratemeter circuit at the optimum condition.

We may therefore plot $N/K^2$ against $M/K^2$, as shown in FIGURE 10. It can be seen in FIGURE 9 that a large increase in $M/K^2$ is needed to produce a small decrease in X. The corresponding increase in $N/K^2$, while less, as shown in FIGURE 10 is also large.

K must be chosen so as to make accidental or false alarms so rare as to be negligible. That is, such alarms should only occur through random voltage fluctuations on an average of once in months or years at most. Table I shows how the probability P(K) that a given value of K will be exceeded falls off in accordance with a Gaussian distribution, which may b e expected when a reasonably large number of pulses is involved, as is the case under all the conditions which will be of interest to us in practice.

If $\tau$ is a minimum time for which a chosen value of K must be exceeded to operate the indicating device and $\rho_F$ is the mean rate of false alarms, we have $$\rho_F \tau < P(K)$$

That is $$\rho_F < \frac{P(K)}{\tau}$$

This inequality follows since all time intervals with output levels above K which operate the indicator must exceed $\tau$ in their duration. Moreover, any other time intervals with output levels above K which do not operate the indicator increase the inequality. $\tau$ may be made negligibly small in comparison with the detection time D in practice.

TABLE I

*Probability of a positive deviation exceeding K standard deviations for a Gaussian distribution*

| K | P(K) |
|---|---|
| 1.62 | $0.5 \times 10^{-1}$ |
| 3.26 | $0.5 \times 10^{-3}$ |
| 4.88 | $0.5 \times 10^{-6}$ |
| 6.49 | $0.5 \times 10^{-10}$ |
| 8 | $10^{-15}$ |
| 10 | $10^{-23}$ |

If one takes $K=10$, which is of the right order and should be adequate for the shortest time-constant proposed, $K^2=100$ and this enables FIGURES 9 and 10 to be read directly in terms of M and N.

In practice, it is only possible to make any given circuit operate satisfactorily over a finite range of values of $\rho$ or of N. This is mainly because of difficulties arising in the circuit used to indicate a significant increase in voltage. However, it is relatively easy to arrange for a simple circuit to provide a nearly constant value of K over a range of 10 to 1 or more in $\rho$, with higher values outside that range. We shall now describe an example of such a circuit and investigate its performance.

Figure 11:
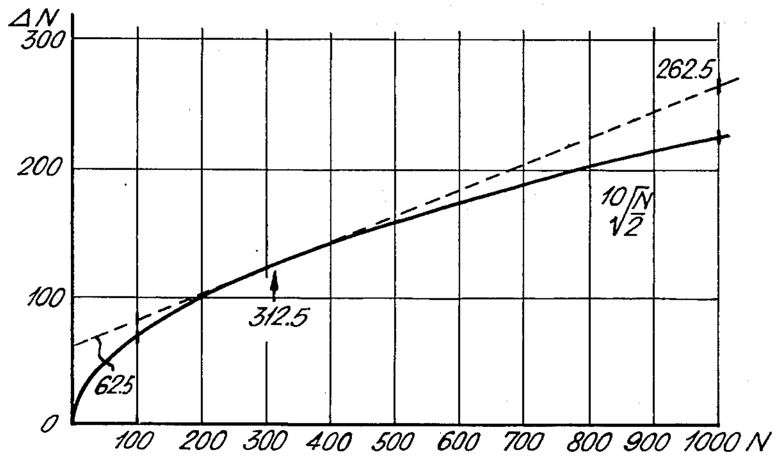
FIGURE 11 shows the approximation of a straight line representing linear bias conditions to a parabole representing exact bias conditions.

A positive voltage from the diode pump circuit in FIGURE 3 is balanced against a negative voltage from the similar circuit (FIGURE 4) of oppositive polarity (receiving the same input pulses, reversed in sign) the values of $R_s C_i V_i$ being the same and hence the mean voltages are equal. The negative circuit has a suitably longer time-constant, and so the difference voltages becomes an indication of the variation of the positive output from its mean value. This difference voltage is applied to a discriminator and at any given steady input pulse rate this discriminator can be biased to operate if the variation is a positive one of significant value. The storage condenser voltage of a diode pump circuit may be specified conveniently, as we have already seen, by N, the equivalent number of input charges. Unfortunately, from the point of simplicity, the discriminator bias required to show a significant variation from a steady mean value of N is $$K\sqrt{\frac{N}{2}}$$

and it is not possible to provide a really simple circuit which will give this accurately over a wide range of values of N. However, if we increase the relative contribution of the output voltage of the long time-constant circuit, a variable bias proportional to N is obtained, in effect. If this bias is combined with a fixed negative bias, also, the minimum increase in N which will operate the discriminator is then given by $$\Delta N = \alpha + \beta N$$

where $\alpha$ and $\beta$ are constants depending on the fixed bias and on the variable bias adjustment, respectively. Such a linear relationship can be made to approximate roughly to the parabola (for constant K)

$$\Delta N = K\sqrt{\frac{N}{2}}$$

over a range of 10 to 1 or more in values of N. In FIGURE 11, for example, taking $$K = \Delta N \sqrt{\frac{2}{N}}$$

it is found that K lies between 10 and 11.8 from $N=100$ to $N=1000$. In this figure, we have taken $$\Delta N = 62.5 + 0.2N$$

as the straight line approximation to the parabola $$\Delta N = 10\sqrt{\frac{N}{2}}$$

At very low values of M the statistics are no longer Gaussian so that a deviation of $K=10$ standard deviations is no longer an extremely improbable event. Considering an extreme value to illustrate this point clearly, let $M=0.005$. This represents an initial mean steady pulse rate of one pulse per 200 periods of the excursion. In this region the bias required approximates to $$K\sqrt{\frac{M}{2}}$$

pulse increments and for $K=10$ this is $$10\sqrt{\frac{0.005}{2}} = 0.5$$

Under these conditions every pulse arriving would trigger the discriminator. It is therefore clear that the minimum bias voltage of a fixed number of increments as provided by the linear bias serves a practical purpose when the statistics become non-Gaussian.

It now remains to investigate how the performance of such a circuit would vary from the theoretical optimum for a fixed value of K. This may be done simply from FIGURE 7 again. It is only necessary to substitute for Equation 13.

$$\frac{B}{B+1} e^{\frac{X}{B}} + \frac{1}{B+1} e^{x} = 1 + \frac{\alpha}{N} + \beta = 1 + \beta + \frac{\alpha}{BM} \quad (14)$$

Figure 12:
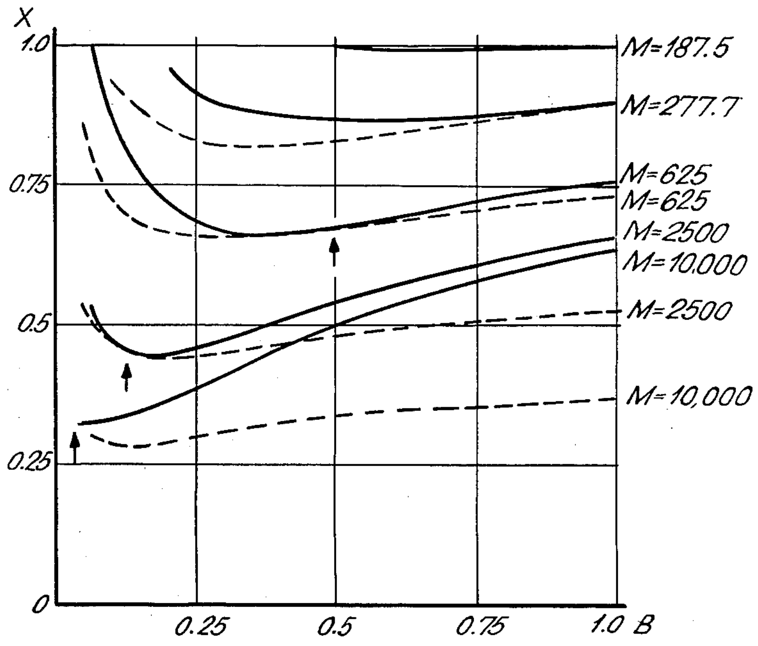
FIGURE 12 is a graphical representation showing the optimum time-constant of the ratemeter circuit for linear bias (solid lines) and for exact bias (dotted lines).

FIGURE 12, which corresponds to FIGURE 8 in the previous case, may then be drawn immediately, for any given values of $\alpha$ and $\beta$. The values taken here are $\alpha=62.5$ and $\beta=0.2$. The corresponding curves for a fixed K of 10, derived from FIGURE 8, are shown by dotted lines, for comparison. The curves for the linear bias approximation case show broad minima only slightly higher than those for the exact square root law case (dotted line). From the position of the tangent (FIGURE 11) at $N=312.5$, it is to be expected that each pair of curves will agree at a value of B to make $N=312.5$. This is indicated by a small vertical arrow under each point of osculation.

Figure 13:
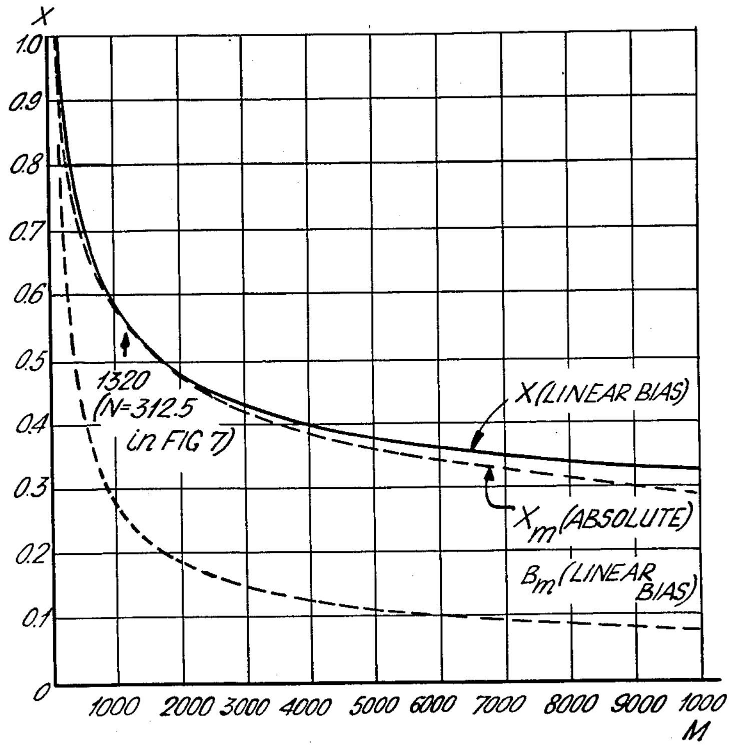
FIGURE 13 is a graph showing the minimum value of X and B for the linear bias case as a function of M, the value of X for exact bias being shown for comparison.

FIGURE 13, which corresponds to FIGURE 9 in the previous case, shows the minimum value of X as a function of M. The values for this curve were computed numerically. The dotted lines show, for comparison, the absolute optimum function $K=10$. (The value of B at the minimum in the linear bias case is also shown.) It will be seen that over a wide range of values of M, from about 200 to 10,000, the minimum value of X obtainable with the linear approximation bias is of the same order as that obtainable with the exact square root law bias for $K=10$ and is little above the absolute optimum value. The values for the whole of this range lie under $$1.5\left(\frac{K^2}{M}\right)^{1/3}$$

which is slightly greater than the approximation (for large $M/K^2$) in the exact bias case. Moreover, since the minima in the linear approximation case are still reasonably broad, there need not be a great further increase because B is only selected from a set of discrete values in practice. (These correspond to the time constants T of the sequence of circuits used and the nearest value may be somewhat off the optimum, depending on how closely the values of T are spaced.)

The performance shown in FIGURE 13 is very satisfactory, but for completeness it is also necessary to determine limits for the performance outside the range shown, that is, for $M<200$ and for $M>10{,}000$. The following two rules by the inventor are useful in this connection.

(a) The value of X at its minimum always decreases for an increase in M.

(b) The value of $\rho D$ at the minimum always decreases for a decrease in M.

Both these rules apply to the ratemeter type of circuit with any biassing arrangement in which the bias is some specified function of N. They therefore apply for both the exact root law bias case and the linear approximation case. Referring to the latter case, and to FIGURE 13, we see that for all $M>10{,}000$ we have $X>0.32$.

Also for all M<200, since $$\rho D \equiv X\rho P \equiv XM$$

$$\rho D<0.964\times 200$$

That is, $$\rho D = XM < 193$$

This tells us that for $M<200$, X lies under a hyperbolic curve passing through the point $M=200$, $X=0.964$ in FIGURE 13. It also tells us that D is always less than the time required to count 193 pulses at the initial rate. This is a conservative estimate, in practice the time may be as low as that required to count only 63 pulses. (In using this approximation, we effectively set a lower limit to the number of pulses which are involved and therefore to the degree of departure from a Gaussian distribution which may be expected.) We may therefore summarise the results for the particular linear approximation bias which we have taken for $K=10$ as follows (Table II).

TABLE II

*Performance of the ratemeter type of circuit with the particular linear bias approximation chosen*

| Condition (M) | Performance (D) | Performance (X) |
|---|---|---|
| $M<200$ | $D<\frac{200}{\rho}$ | $X<\frac{200}{M}$ |
| $200<M<10{,}000$ | $D<1.5\left(\frac{100}{M}\right)^{\frac{1}{3P}}$ | $X<1.5\frac{100}{M}^{\frac{1}{3}}$ |
| $M>10{,}000$ | $D<0.32P$ | $X<0.32$ |

The random fluctuations which will be superimposed on any actual rising input to a diode pump circuit will inevitably affect the time that the voltage output takes to reach the triggering level, and may either increase or decrease this time. Such fluctuations will usually affect the effective triggering level by about 1 part in K (for example, $\pm 10\%$ for $K=10$) and since the response of the circuit to an excursion is an upcurving rather than a linearly rising one, the fluctuation in the time of response should be somewhat less. This variation, is, of course, inherent in the nature of the signal being received. That is, it means, in effect, that owing to the random fluctuation, the increase in the input pulse rate from the detector has not precisely followed the general increase in flux level. No possible modification to the circuit following the detector could alter this. The variation is quite a small one and should not normally be of any importance.

Figure 4:
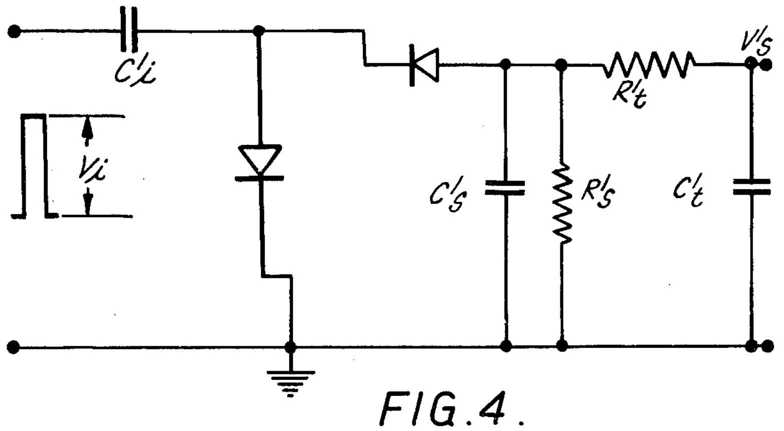
FIGURE 4 is a circuit diagram of a counter-balancing diode pump ratemeter circuit.

The positive and negative diode pump circuits of each pair may be identical, apart from polarity, if the necessary time-constant for the negative-output circuit is obtained by means of an integrating circuit, as shown in FIGURE 4. Moreover, the pairs of circuits need only differ from each other in the values of the leakage resistor $R_S$ used. In this case, the charge and voltage increments per pulse are the same for all the circuits. The biassing arrangements can then be the same for every pair of circuits and any pair of circuits performs exactly the same as any other pair, in theory, provided that the initial input pulse rate considered is varied in inverse proportion to the time-constant of the circuit and the time-scale of the excursion considered is varied in direct proportion to it. That is to say, the successive pairs of circuits differ only in their time scale.

Figure 14:
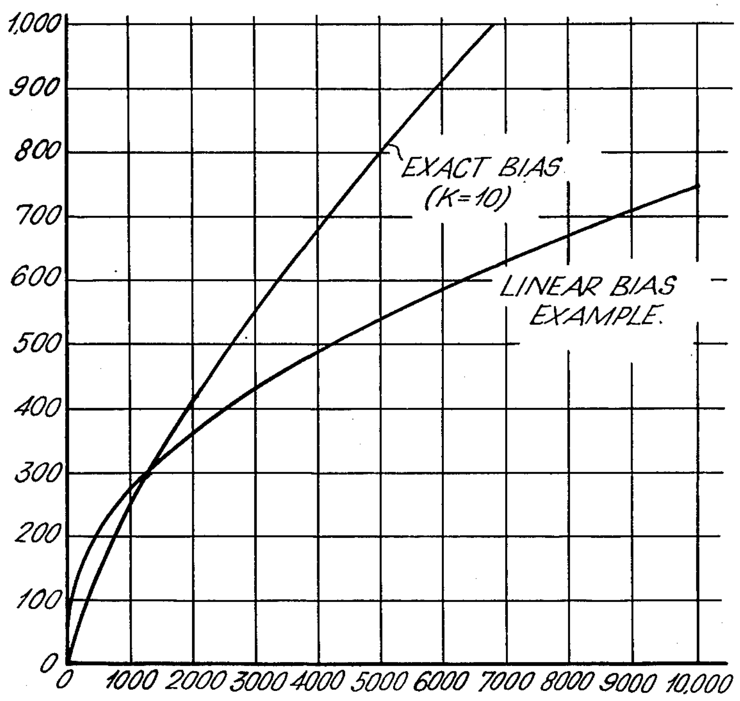
FIGURE 14 shows the relationship between N and M in the diode pump ratemeter circuit, the solid line being for linear bias and the dotted line being for exact bias.

The circuit that responds first will normally be the one having the time-constant T which gives with the intial count-rate $\rho$ the value of $N=\rho T$ which is nearest to the optimum for the value of M in the excursion concerned (see FIGURE 14). This is the same as taking the time-constant T that corresponds to the value of B nearest to the minimum in the appropriate curve of FIGURE 12. Since the minima of the curves in this latter figure are fairly broad, it is not necessary to have very closely spaced values of T to ensure that the nearest actual delay is reasonably close to the minimum delay. For example, one might take spacings by a factor of $\sqrt{10}$. If one applies this to the curve for $M=2500$ in FIGURE 12, one finds that in the worst case X would be increased to about 0.465 from its minimum value of 0.446, an increase of 6.5%, which would not be too serious.

The primary requirement in the performance of the equipment discussed has been that it should detect the commencement of an excursion, particularly a short-lived excursion, with the utmost speed. When the invention is used in a nuclear reactor, it is an essential corollary that it should be completely free from false alarms when the reactor power is increased or decreased to meet fluctuating demands. It is obviously undesirable that the equipment should be put out of action while the power level of a reactor is being altered, for it is during this operation that there is an increased probability of an undesirable excursion.

One answer to the problem would be to withdraw the neutron detector from its initial position in the reactor to a position of different neutron flux in a controlled manner during the power change so that the mean input pulse rate remains constant. A simpler answer is to reduce the response of the excursion detection equipment to long-period excursions with more than a specified minimum period. This may be done by a suitable choice of sensing means time-constant and of the maximum storage means time-constant. For example, considering the diode-pump circuit if the time-constant is 3 sec. and biasing circuit time constant is 3 sec., reactor increases of more than 10 secs. period will not set the alarm off. With excursion of 3 sec. or less the alarm operates. There would be some decrease in the speed of response for the slowest undesired excursions, due to partial following by the balancing circuit. There would also be some decrease in the margin of protection against false alarms due to random variations, for the fastest controlled changes in power level, due to incomplete following of the mean level by the balancing circuit. However, neither of these effects would be too serious, provided that there was a reasonable margin between the maximum period requiring recognition for alarm purposes and the minimum desired period of controlled variations.

One would normally use a fairly high resistor in the integrating circuit, to obtain the desired time-constant without using an unduly large capacitor. For example in the circuit of FIGURE 4, one might use 30MΩ for $R_t$ and 1$\mu$ F for $C_t$. To give a typical range of T from 10 $m$S to 10 S, with $C_s$ at 1$\mu$ F also, one would require values of $R_s$ (7 values at $\sqrt{10}$ spacing) ranging from 10 KΩ to 10MΩ. It is clear that the loading effect of the integrating circuit would be negligible on all these circuits except possibly one or two at the highest time-constant end, where it might cause a small modification of performance. The circuit used for adding the positive and negative output voltages and the bias voltage must be suitable for the relatively high output impedance of the integrating circuit, if this is used.

The circuits proposed are basically simple ones and their performance is correspondingly amenable to calculation. It is necessary to bear in mind that as the output voltage $V_s$ of a diode pump circuit increases the increments of voltage per pulse decrease in proportion to $V_i - V_s$. To achieve a performance close to that given in Table II, it is necessary that this effect should not be too serious at the maximum value of N concerned, which is 745 at $M=10{,}000$. From the definition of N given in Equation 10, we have $$\frac{V_s}{V_i}=N\frac{C_i}{C_s}$$

If the value of $C_i$ is 100 $p$F and the value of $C_s$ is 1$\mu$ F, this makes $V_s$ less than 8% of $V_i$ at $N=745$. This would not cause a serious departure from the performance stated in Table II.

It is not desirable to use too small a value of $C_i$, as this capacitor then acts as a capacity voltage divider with the diode pump circuit stray input capacity and the effective input pulse voltage is reduced accordingly. This effective pulse voltage determines the saturation output voltage, which equals it. We have seen above that the range of values of N of interest in the particular example taken is about $N=150$ to 750. If $C_i$ and $C_s$ have the values of 100 $p$F and 1$\mu$ F, respectively, as suggested above, and $V_i=200$ v., this gives a working range of $V_s$ of 3 v. to 15 v., and a corresponding range of bias voltages of 1.85 v. to 4.25 v., which is quite suitable for the sensitive discriminators now available, even allowing for some attenuation in the adding circuit. It does not follow that it would be necessary to use a separate discriminator for each time-constant for the diode pump circuits, as one can connect the outputs from several such circuits to a common discriminator via suitable diodes.

Thus, as indicated in FIG. 20, one embodiment of the invention comprises a plurality of units 1, each representing one sensing circuit as shown in FIG. 5 and having a common input terminal 2. As already explained with reference to FIG. 5, each unit 1 consists of a diode-pump circuit, a circuit which inverts and further integrates the diode-pump output to provide the balancing bias, and a circuit which mixes the diode-pump output with the bias to derive a difference output. The output time-constants of the diode-pump circuits of sequential units 1 are spaced by a small ratio as already described. The outputs of the units 1 are fed via the diodes MR3 (see FIG. 5) to a common discriminator 4.

Since the speed of performance specified in Table II is to be obtained from circuits functioning with values of N between 150 and 750, in every case, our main concern with values of N outside that range is that they should not give rise to any false alarms. For the lower values of N, it is clear from FIGURE 11 that the value of K for this circuit increases very rapidly as N decreases, so that the probability of a false alarm arising at the lower values of N is negligible, even though one may not be able to assume the Gaussian distribution, which was taken for higher values of N, when $N<150$. For the highest values, $N>750$, since the effect of saturation is always to increase the voltage increments and therefore the output voltage below the values specified in our theory and since K increases also as N increases, the chances of false alarms in this region are even less than in the working region and therefore negligible. Provision must be made, of course, for other less sensitive devices to come into operation or for other detectors at points of lower neutron density to be brought into use, when the operating flux level required is beyond the range of the shortest time-constant circuits (which saturate at the highest input rates). This is normal practice. At higher input rates, there is no longer any fundamental difficulty in obtaining rapid recognition of short period excursions.

The type of circuit described has the advantage that if the diode pump circuit which should give the first warning of a particular excursion has failed, its duty will be taken over by a neighbouring one requiring only a slightly longer time to act. Moreover, the whole assembly should be sufficiently simple to be built into a moderately sized unit and used in duplicate or triplicate as might be required by the safety policy for the reactor concerned.

Figure 15:
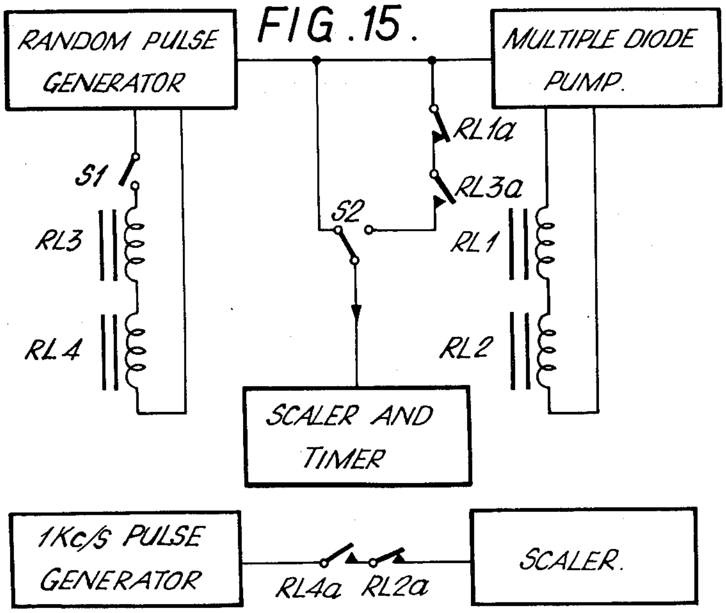
FIGURE 15 is a block diagram of apparatus used to measure the delay in recognition by a diode pump ratemeter circuit of a sudden excursion in the pulse rate of a random generator.

The apparatus which was used to measure the delay in the action of the recognition circuit (multiple or single) is shown in a block diagram in FIGURE 15. It includes a random pulse generator, which can give randomly timed pulses at a steady mean rate or can produce exponential excursions in the pulse rate on demand. The measurement of D itself is quite accurate and straight-forward, being done by counting regularly spaced pulses, at an accurately known frequency of 1 $Kc.$/S, from the time that the excursion is started to the time that the discriminator operates. High-speed relays are used, so that the contribution to the error from any difference in their operating times is negligible. The operating times are each less than 1 $m$S. To compare the value of D obtained with the theoretical value, it is necessary to know the time-constant T of the circuit, in the case of the single diode pump. The initial steady pulse rate $\rho$ and the excursion period P are also required, in both cases. The time-constant T may be obtained as the product of the resistance $R_s$ and the capacity $C_s$, which may be measured with sufficient accuracy on a suitable bridge. The values of $\rho$ and P are selected by the setting of the random pulse generator but, to minimise the effects of any drift in the calibrations for these, they may be measured anew at the time of each experiment, as follows. The value of $\rho$ is determined by counting the output pulses for a sufficiently long and accurately known time interval, just before the excursion starts. The value of P is determined from $N_e$, the number of pulses which have, at the time of detection, been sent out by the pulse generator during the excursion, by means of the following relationship.

$$N_e=\int_0^D \rho e^{\frac{t}{P}} dt$$

$$=\rho P\left(e^{\frac{D}{P}}-1\right)$$

$$\frac{N_e}{\rho D}=\frac{P}{D}\left(e^{\frac{D}{P}}-1\right)$$

$$=\frac{1}{X}(e^X-1)$$

This function of X is plotted in FIGURE 16, which may be used conversely to find the value of X, and therefore of P, from the experimental value of the function.

The experimental results reported here were all made with a small dead-time of 1.5 $\mu$ S in the input pulse generating circuit and the dead-time has not exceeded 1.7% of the total time.

Given a source of randomly timed pulses, capable of generating exponential excursions in the pulse rate, one may test the response time of the single diode pump circuit and biassed discriminator for excursions of different initial mean rates and periods. The absolute time scale has no significance in the theory and the calculated results for a single circuit may be put in the general dimensionless form shown in FIGURE 17. In this figure, the ordinate X is the delay time D between the start of the excursion and the operation of the discriminator, divided by the period P of the excursion. B is the time-constant T of the working diode pump circuit, divided by P. M is the initial steady pulse rate $\rho$, multiplied by P. The curves give the predicted results for the circuit described. A number of experimentally obtained points are also shown. It will be seen that, on the whole, these points are in good accordance with the theoretical curves.

In the multiple diode pump circuit, the output from the first diode pump circuit to pass its own bias level is used to operate the discriminator. The individual diode pump circuits are as shown in FIGURE 3 and their biasing circuits are as shown in FIGURE 5. The outputs of the latter are connected, through a diode in each case, to a common line to the discriminator. The first output to go positive causes its diode to conduct and operate and the discriminator, the other diodes remaining cut off. FIGURE 18 shows a considerable number of experimental points, obtained in this way. It will be seen that these are in good general agreement with the theoretical curves, the solid curve referring to closeby spaced time constants, and the dotted curve referring to spacings of $\sqrt{10}$, although somewhat higher, on the whole. The performance is nevertheless very satisfactory from the point of view of application to an automatic protection and warning system.

The probability per century of a false alarm from the multiple circuit, as designed, is very small indeed and it is obviously impracticable to measure the actual rate to confirm that this is achieved. The equipment has been left set up for periods of several days in its normal condition without any false alarms occurring. Suitable pulse rates were obtained from a radioactive source and detector in these tests. The probability that a given diode pump circuit will have an output at any instant above a given bias voltage decreases very rapidly as the bias voltage is increased and the number of false alarms obtained may be expected to decrease accordingly. It is therefore of considerable interest to set the equipment up for false alarm tests with both the fixed and variable bias set at some chosen fraction of the normal value. In this way, tests were carried out with linear bias approximations to $K=6.0$, 6.5, 7.0, 7.5, 8.0 and 9.0, as well as 10. In FIGURE 19, the logarithm of the reciprocal false alarm rate is plotted against the value of K.

When extrapolated linearly by a least squares fit (the accuracy of the successive setting of K was not high), it shows that the false alarm rate is about one per 300 years at $K=10$.

It is assumed that the output voltage must exceed the discriminator bias level for a minimum time $\tau$ before the discriminator triggers. It follows from this that the false alarm rate $\rho$F is given by $$\rho F=\frac{\theta P(K)}{\tau}$$

where P(K) is the probability in a Gaussian distribution of exceeding K standard deviations and $\theta<1$. Now for reasonably large values of K, say $K\geqslant 6$, it is a good approximation (to about 1 part in $K^2$) to take $$P(K)=\frac{1}{\sqrt{2\pi}}\frac{e^{\frac{-K^2}{2}}}{K}$$

giving $$\log_e(1/\rho F)=\frac{K^2}{2}+\log_e K-\log_e\theta+\log_e\tau+\log_e\sqrt{2\pi}$$

It is reasonable to suppose that the term $K^2/2$ will predominate in any changes in log $(1/\rho F)$ with K. In fact, the experimental results given in FIGURE 19 are in accordance with this, as the slope of the line drawn through the points is roughly correct (5.59 as compared with a predicted value of 7.14 at $K=7$, taking the log K term into account). Since the $K^2$ term has an increasing rate of rise as K increases, the linear extrapolation used in FIGURE 19 is probably conservative in estimating the mean time between false alarms at $K=10$.

I claim:

1. Apparatus for the rapid detection of excursions in the mean pulse-rate of a succession of randomly occurring pulses comprising a plurality of pulse ratemeter circuits having their inputs connected to receive said pulses and to produce outputs proportional to the pulse-rate, said circuits having time-constants matched to successive values within a range of rates of excursion desired to be detected, a corresponding plurality of biasing circuits each associated with one of said ratemeter circuits, each biasing circuit including an integrating circuit having an output proportional to the pulse-rate but integrated with a longer time-constant than the output of its associated ratemeter circuit to provide a bias varying with the mean pulse-rate prior to an excursion, means for comparing the output of each ratemeter circuit with the output of its associated biasing circuit, and discriminator means for detecting when the output of any ratemeter circuit differs from that of its associated biasing circuit by a given amount.

2. Apparatus as claimed in claim 1 wherein each biasing circuit provides a bias consisting of a fixed component plus a component proportional to the mean pulse-rate prior to an excursion.

3. Apparatus as claimed in claim 1 wherein the integrating circuit in each biasing circuit is connected to integrate and invert the output of its associated ratemeter circuit.

4. Apparatus for the rapid detection of excusions in the mean pulse rate of a succession of randomly occurring pulses comprising a plurality of diode-pump circuits having their inputs connected to receive said pulses, said diode-pump circuits having output time-constants matched to successive values within a range of rates of excursion desired to be detected, a corresponding plurality of biasing circuits with each biasing circuit being associated with one of said diode-pump circuits, each biasing circuit including an integrating circuit for further integrating and inverting the output of its associated diode-pump circuit to provide a bias exceeding a fixed level by an amount proportional to the mean pulse-rate prior to an excursion, means for comparing the output of each diode-pump circuit with the output of its associated biasing circuit, and discriminator means for detecting when the output of any diode-pump circuit differs from that of its associated biasing circuit by a given amount.

5. Apparatus as claimed in claim 4 wherein said discriminator means comprises a single discriminator connected to receive the outputs of all said comparison means.

References Cited by the Examiner

UNITED STATES PATENTS

| | | | |
|---|---|---|---|
| 2,507,359 | 5/1950 | Weisz | 315—134 X |
| 2,931,761 | 4/1960 | Hurwitz | 250—83.1 |
| 2,982,473 | 5/1961 | Goertzel | 250—83.1 |
| 2,986,636 | 5/1961 | Carlson | 250—83.1 |
| 3,069,545 | 12/1962 | Lide | 250—83.1 |

OTHER REFERENCES

"French Reactor Instrumentation," by Weil, Nucleonics, vol. 15, No. 8, August, 1957, pages 45 to 49.

RALPH G. NILSON, *Primary Examiner.*

JAMES W. LAWRENCE, *Examiner.*